US011305490B2

(12) United States Patent
Brugue Garvi et al.

(10) Patent No.: US 11,305,490 B2
(45) Date of Patent: Apr. 19, 2022

(54) ADDITIVE MANUFACTURING WITH TRAVERSING IRRADIATION REGION

(71) Applicant: HEWLETT-PACKARD DEVELOPMENT COMPANY, L.P., Houston, TX (US)

(72) Inventors: Joaquim Brugue Garvi, Sant Cugat del Valles (ES); Alejandro Manuel De Pena, Sant Cugat del Valles (ES); Esteve Comas, Sant Cugat del Valles (ES); Juan Manuel Valero Navazo, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 619 days.

(21) Appl. No.: 16/097,819

(22) PCT Filed: Jul. 22, 2016

(86) PCT No.: PCT/US2016/043531
§ 371 (c)(1),
(2) Date: Oct. 30, 2018

(87) PCT Pub. No.: WO2018/017122
PCT Pub. Date: Jan. 25, 2018

(65) Prior Publication Data
US 2019/0134904 A1    May 9, 2019

(51) Int. Cl.
*B29C 64/295* (2017.01)
*B33Y 30/00* (2015.01)
(Continued)

(52) U.S. Cl.
CPC .......... *B29C 64/295* (2017.08); *B29C 64/165* (2017.08); *B29C 64/20* (2017.08);
(Continued)

(58) Field of Classification Search
CPC ... B29C 64/295; B29C 64/227; B29C 64/393; B33Y 50/02; B33Y 30/00
See application file for complete search history.

(56) References Cited

U.S. PATENT DOCUMENTS 6,755,518 B2   6/2004  Codos
7,291,364 B2   11/2007 Faulkner et al.
(Continued)

FOREIGN PATENT DOCUMENTS

CN   102582080   7/2012
CN   105751496   7/2016
(Continued)

OTHER PUBLICATIONS

International Search Report and Written Opinion for International Application No. PCT/US2016/043531, dated May 18, 2017, 8 pages.
(Continued)

*Primary Examiner* — Michael M. Robinson
(74) *Attorney, Agent, or Firm* — HP Inc. Patent Department

(57) ABSTRACT

There is disclosed additive manufacturing apparatus (10), (22), (34) comprising: a heater (18), (36) to direct radiant heat onto an irradiation region (20) of a build platform (12), at least part of the heater (18), (36) being moveable to cause the irradiation region (20) to traverse over the build platform (12); a coating module (14) moveable relative the heater (18), (36) to traverse the build platform (12) to apply a build material onto the build platform (12); and a print module (16) moveable relative the heater (18), (36) to traverse the build platform (12) to selectively eject a print agent onto the build material.

12 Claims, 5 Drawing Sheets

(51) Int. Cl.
   *B29C 64/393* (2017.01)
   *B29C 64/386* (2017.01)
   *B33Y 10/00* (2015.01)
   *B33Y 50/00* (2015.01)
   *B29C 64/20* (2017.01)
   *B29C 64/165* (2017.01)
   *B29C 64/364* (2017.01)
   *B33Y 50/02* (2015.01)
   *B29C 64/227* (2017.01)

(52) U.S. Cl.
   CPC .......... *B29C 64/227* (2017.08); *B29C 64/364* (2017.08); *B29C 64/386* (2017.08); *B29C 64/393* (2017.08); *B33Y 10/00* (2014.12); *B33Y 30/00* (2014.12); *B33Y 50/00* (2014.12); *B33Y 50/02* (2014.12)

(56) References Cited

U.S. PATENT DOCUMENTS

| | | |
|---|---|---|
| 7,771,183 B2 | 8/2010 | Hull et al. |
| 8,567,936 B2 | 10/2013 | Edwards |
| 2003/0213552 A1 | 11/2003 | Chen et al. |
| 2007/0241482 A1 | 10/2007 | Giller et al. |
| 2011/0059247 A1 | 3/2011 | Kuzusako et al. |
| 2017/0021419 A1* | 1/2017 | Ng .................. B33Y 10/00 |
| 2017/0252974 A1* | 9/2017 | Ng .................. B22F 10/10 |
| 2017/0355137 A1* | 12/2017 | Ederer ............. B29C 64/165 |

FOREIGN PATENT DOCUMENTS

| | | |
|---|---|---|
| EP | 0776713 | 6/1997 |
| RU | 2552235 C1 | 6/2015 |
| TW | 201618937 | 6/2016 |
| WO | WO-2015136277 A1 | 9/2015 |
| WO | WO-2016048348 A1 | 3/2016 |
| WO | WO-2016068899 A1 | 5/2016 |

OTHER PUBLICATIONS

Spectrum Z™ 510 3D Printer Hardware Manual, Z Corporation, 79 pages, Aug. 2007.

* cited by examiner

ADDITIVE MANUFACTURING WITH TRAVERSING IRRADIATION REGION

BACKGROUND

Additive manufacturing systems that generate three-dimensional objects on a layer-by-layer basis have been proposed as a potentially convenient way to produce three-dimensional objects.

In one example of additive manufacturing, an object is generated by solidifying portions of layers of build material. In some examples, the build material may be in the form of a powder.

In some such processes, energy may be applied to a build material. For example, energy may be applied to preheat the build material to a temperature which is close to its melting point. Energy may also be applied to cause melting, so that regions of the build material may fuse to form portions of an object.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification (or fusing) of a build material. In one example the build material may be powder-based and the properties of generated objects may depend on the type of build material and the type of solidification mechanism used. In a number of examples of such techniques including sintering and fusing techniques, build material is supplied in a layer-wise manner and the solidification method includes heating the layers of build material to cause fusing (melting) in selected regions. In other techniques, chemical solidification methods may be used.

In example additive manufacturing techniques, a fusing agent (also known as a coalescent agent) may be selectively ejected onto build material, for example using a print agent distributor such as a piezo or thermal printhead. The fusing agent may be capable of absorbing radiation (radiant heat energy) and transferring thermal energy to build material in contact with the fusing agent. This may cause the build material to fuse. Fusing agent may be ejected onto a layer of build material in a pattern corresponding to or based on a slice of a three-dimensional object, and the layer may be exposed to radiation to selectively fuse the build material to which fusing agent has been applied to form a layer of the object corresponding to the respective slice.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

A print device for additive manufacture (i.e. an additive manufacturing apparatus) may either receive model data relating to pre-generated slices for forming in layers of build material, or may receive data relating to a three-dimensional model, which is then processed within the print device to generate slices, which are then formed in layers of build material.

Figure 1:
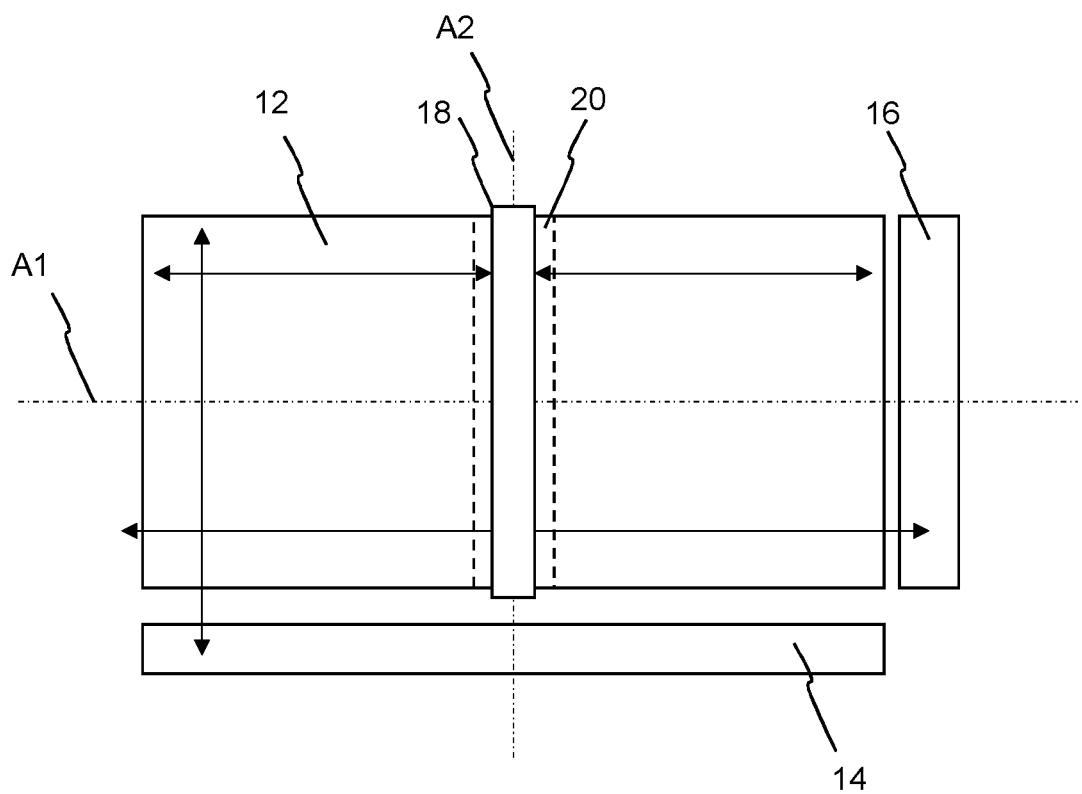
FIG. 1 is a simplified schematic of an example of an additive manufacturing apparatus in plan view.

FIG. 1 schematically shows an example additive manufacturing apparatus 10. The apparatus 10 comprises a build platform 12; coating module 14, print module 16 and heater 18.

The build platform 12 is to receive build material for selectively fusing, and generally comprises a rectangular platform with a horizontally-oriented upward-facing surface for receiving build material thereon. In this example, the build platform has a width along a first lateral (horizontal) axis A1 (the left-to-right direction in FIG. 1) which is greater than its depth along a second lateral axis A2 (the top-to-bottom direction in FIG. 1).

The coating module 14 is generally elongate along the first lateral axis A1. The coating module 14 is to traverse the build platform (i.e. moveable over the build platform) back and forth along the second lateral axis A2 to apply a layer of build material onto the build platform in a coating cycle. During an additive manufacturing procedure, the coating module 14 applies successive layers of build material onto the build platform, which are successively selectively fused to generate a three-dimensional object. In this particular example, the coating module 14 is moveable over the build platform 12 from a storage position laterally adjacent the build platform 12 to which it can return to clear the space above the build platform 12 for subsequent printing or heating.

In this example, the print module 16 is generally elongate along the second lateral axis A2 and is to traverse over the build platform 12 along the first lateral axis A1. The print module 16 carries a printhead, such as a thermal or piezo printhead, to selectively eject a print agent onto build material received on the build platform 12. In this example, the print module 16 is to traverse back and forth over the build platform 12 along the first lateral axis A1. Accordingly, the print module 16 and the coating module 14 traverse the build platform 12 along orthogonal directions (or axes). As with the coating module 14, the print module 16 is moveable back and forth over the build platform 12 from a storage position laterally adjacent the build platform 12.

In this particular example, the coating module 14 and the print module 16 are disposed at substantially the same vertical position above the build platform 12, such that in use movement of either one over the build platform 12 is scheduled to avoid intersection with the other.

The heater 18 is generally elongate along the second lateral axis A2, and is to direct radiant heat onto the build platform 12. As shown in FIG. 1, there is an irradiation region 20 corresponding to the region where radiant heat from the heater 18 is received (i.e. either on the build platform 12 or build material received thereon). The heater 18 is configured so that the irradiation region 20 traverses over the build platform 12 in use. In this particular example the irradiation region 20 traverses back and forth along the first lateral axis A1. The heater may be to pre-heat the build material. The heater may also be to cause fusing of the build material.

In this particular example, the heater 18 is to traverse over the build platform 12 back and forth along the first lateral axis A1 and at a level (i.e. a vertical level) above the print module 16 and the coating module 14. Accordingly, the heater 18 can traverse the build platform 12 independently of any traversing movement of the print module 16 and the coating module 14.

In other examples, the heater 18 may have a pivotable heater element or pivotable guide element (such as a reflector) to pivot through an angular range of movement and thereby direct radiant heat so that the irradiation region 20 traverses over the build platform 12, as will be described in detail below with respect to FIG. 4.

Figure 2:
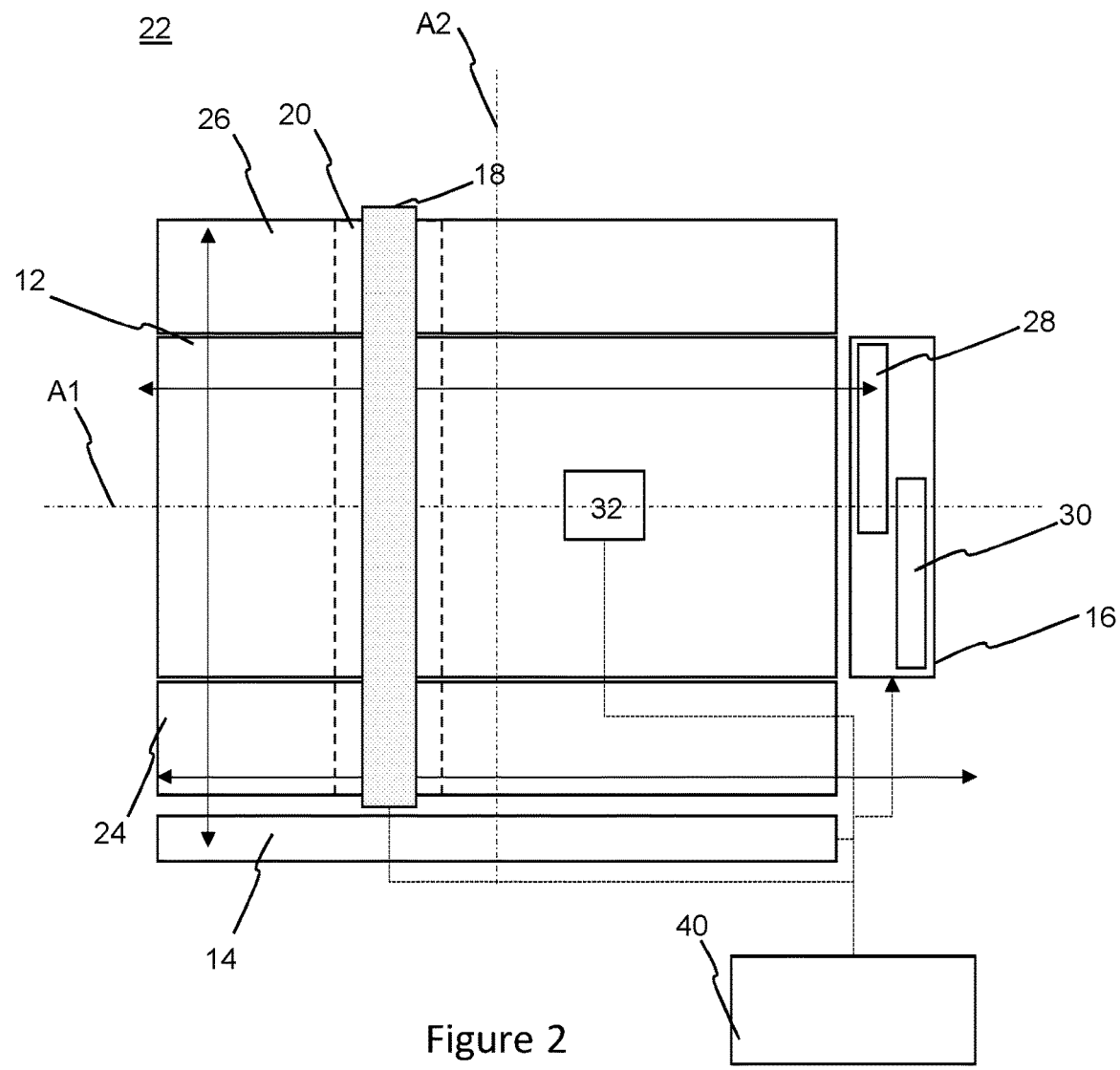
FIG. 2 is a simplified schematic of a further example of an additive manufacturing apparatus in plan view.
Figure 3:
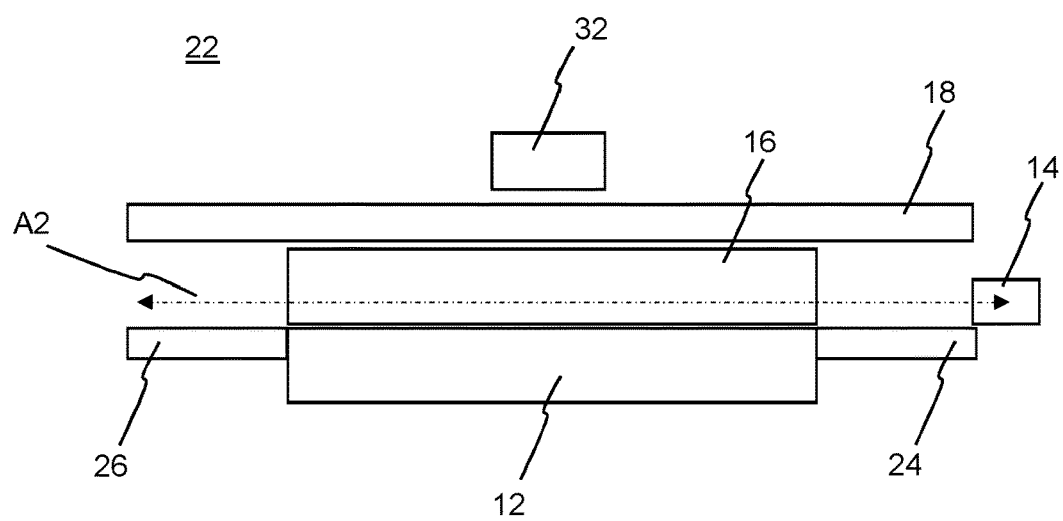
FIG. 3 is a simplified schematic of the additive manufacturing apparatus of FIG. 2 in side view.

FIGS. 2 and 3 show a further example additive manufacturing apparatus 22. FIG. 3 shows a side view of the apparatus so that the second lateral axis A2 extends across the drawing (i.e. from left to right as shown). The apparatus 22 has several components in common or similar to those described above with respect to the apparatus 10 of FIG. 1, including the build platform 12, and the general configuration of the coating module 14, the print module 16 and the heater 18.

In this particular example, the additive manufacturing apparatus 22 additionally comprises forward and aft build material supply zones 24, 26 laterally adjacent the build platform 12, such that boundaries between each zone 24, 26 and the build platform 12 lie along the first lateral axis A1.

The build material supply zones 24, 26 are to receive build material to be applied onto the build platform 12. The coating module 14 is to move from a position over a build material supply zone 24, 26 and traverse over the build platform 12 in order to apply a layer of build material onto the build platform 12. The build material supply zones 24, 26 may be supplied with build material from, for example, a build material conveyer extending from a separate reservoir or store of build material to the build material supply zones 24, 26. In this example, the coating module 14 has a storage position laterally adjacent a build material supply zone 24, 26, so that build material in the respective zones can be heated by the overhead heater 18, as will be described in detail below. In other examples, the storage position of the coating module may be over one of the zones 24, 26. As shown in FIG. 2, the coating module 14 is coupled to a controller 40 for controlling traversing movement of the coating module over the build platform 12.

In this example, the print module 16 comprises two discrete printheads 28, 30. As shown in FIG. 2, in this example the printheads 28, 30 partially overlap so that their mutual alignment can be adjusted. The print module 16 is coupled to the controller 40 for controlling traversing movement of the print module 16 over the build platform 12.

In examples, such as the examples shown in FIGS. 1-2, the build platform 12 may have a width along a first lateral axis A1 greater than a depth along a second lateral axis A1 orthogonal with respect to the first. In examples where the print module 16 is to traverse over the build platform 12 along the first lateral axis A1, whereas the coating module 14 is to traverse over the build platform 12 along the second lateral axis, this may reduce the complexity and expense of providing a build platform 12 of a first surface area, as compared with a square build platform of the same first surface area or other arrangements of the print module and coating module. In particular, owing to the complexity of a print module, it may be difficult and expensive to manufacture a print module of large length. Conversely, the applicant has found that the incremental cost for increasing a length of a coating module is comparatively inexpensive. Accordingly, providing an apparatus in which the print module extends along the shorter axis and traverses along the longer axis of the build platform may reduce complexity and cost of the apparatus. Further, providing the heater 18 to extend along the shorter axis and cause an irradiation region to traverse along the longer axis may minimize equipment and operating costs of the heater. Whilst pre-heating of the build material supply zones may be achieved by extension of the heater 18 over such supply zones, the applicant has found that any resulting equipment cost to provide such pre-heating may be offset by efficiencies that may be achieved by providing the coating module to extend along the longer axis and traverse the shorter axis, as described above.

In this example, the heater 18 has a length along the second lateral axis A2 greater than the corresponding length of the print module 16, such that the heater 18 extends over the forward and aft build material supply zones 24, 26.

As shown in FIG. 2, in this example the heater 18 is to traverse over the build platform 12 in order to cause an irradiation region 20 beneath the heater 18 to traverse over the build platform 12.

Each of the coating module 14, the print module 16 and the heater 18 may be mounted on respective guides, for example rails supported on a structural support, and may be to traverse over the build platform 12 by moving along the respective rails. A support structure for such guides may be common. For example, in this example the print module 16 is moveable along the first lateral axis A1, and likewise the heater 18 is moveable along a direction parallel with the first lateral axis A1 (vertically offset since the heater 18 is disposed above the print module 16). A common support structure may be provided with independent rails or guides for each of the print module 16 and the heater 18, arranged so that the print module 16 and heater 18 do not intersect as they pass one another. In other examples, the heater 18 may share a common support structure with a different carriage, such as the coating module 14, when the respective carriage is arranged for parallel movement with the heater 18.

FIG. 3 shows an example apparatus 22 in which the coating module 14 and the print module 16 are positioned at substantially the same vertical level, such that they would intersect each other if actuated to traverse the build platform 12 at the same moment. In this example the heater 18 is positioned above the print module 16, and also the coating module 14, so that it can traverse over the build platform 12 independently of any traversing movement of the coating module 14 and of the print module 16. In examples, any carriage traversing below the heater, for example the print module 16 and the coating module 14, may be provided with reflectors for reflecting radiant heat from the heater to protect such carriages. For example, such reflectors may be provided in the form of a casing comprising reflective material, or may be provided as reflective elements mounted on such carriages.

In examples, the heater 18 may have a plurality of heater elements along its length, each heater element being individually controllable so that the heater 18 can emit a profile of radiant heat which varies along its length. The controller

40 may control the power supply or heat output of each heater element to result in a varying profile of radiant heat. Further, in examples the controller 40 may vary the profile as the heater 18 traverses the build platform so that a profile of radiant heat emitted onto the build platform 12 varies both along the first lateral axis A1 and the second lateral axis A2. The heater traversing rate at which the irradiation region 20 is caused to traverse the build platform may also be varied to adjust the radiant heat received by portions of the build platform, as will be described with reference to FIG. 7 below.

The example print apparatus 22 of FIGS. 2 and 3 further comprises a sensor 32 for monitoring the temperature of build material on the build platform 12. For example, the sensor may be an infrared image sensor to determine a temperature profile over the build platform which varies along both the first lateral axis A1 and the second lateral axis A2 based on infrared light received at the sensor 32. In this example, the sensor 32 is coupled to the controller 40 to provide temperature feedback to the controller 40, such that the controller 40 may determine a profile of radiant heat to output using the heater 18 based on the output of the sensor 32.

In this particular example, the sensor 32 is provided in the form of an infrared camera sensor disposed above the build platform 12 and above a level of the heater 18 (see FIG. 3). The sensor 32 is positioned so that it receives infrared light emitted from the build platform 12 and both of the forward and aft build material supply zones 24, 26. In other examples, the sensor 32 may be positioned so that it receives infrared light from at least the build platform 12.

In this example, the sensor 32 is statically mounted so that it does not move laterally relative the build platform during a layer cycle. However, in other examples one or a plurality of sensors for monitoring the temperature of build material on the build platform may be mounted on a carriage to traverse over the build platform. This may be an independent carriage for the sensor(s), or the sensors may be mounted to either of the heater 18, the print module 16 or the coating module 14.

Figure 4:
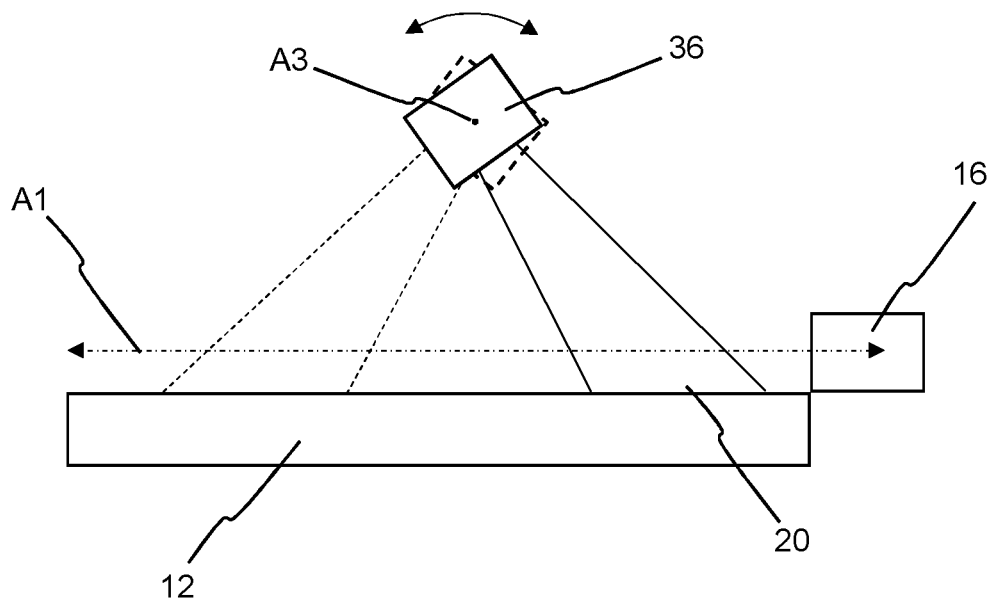
FIG. 4 is a simplified schematic of a further example additive manufacturing apparatus in side view.

FIG. 4 shows a further example additive manufacturing apparatus 34 which differs from the apparatus 10 described above with respect to FIG. 1 and the apparatus 22 described above with respect to FIGS. 2 and 3 in that the heater 36 is to pivot about a pivot axis A3.

FIG. 4 shows a side view of the print apparatus 34 such that the first lateral axis A1 extends across the figure. As shown in FIG. 4, the heater 36 is disposed at a level above the print module 16, which is moveable over the build platform 12 along the first lateral axis A1 as described above. The heater 36 is pivotable about a pivot axis A3 which in this example is parallel with the second lateral axis A2. In this example, the heater 36 has a substantially central position with respect to the width of the build platform 12 (i.e. its extent along the first lateral axis A1), and is elongate along the second lateral axis A2. In examples, the heater 36 may have an elongate extent corresponding to the depth of the build platform 12 (i.e. its extent along the second lateral axis A2) or may have an elongate extent corresponding to the build platform in addition to any build material supply zone adjacent the build platform, for example.

As shown in FIG. 4, the heater 36 is to emit a beam of radiant heat to form an irradiation region 20 on the surface of the build platform (or on any build material received thereon). As the heater 36 pivots, the beam and thereby the irradiation region 20 is caused to traverse over the build platform 12. The heater 36 or a controller for the heater may be to control the power output of the heater 36 to adjust for any change in path length between the heater 36 and the irradiation region, which may be a function of the angle of the heater 36 relative the build platform 12.

In this particular example, the heater 36 is provided as a unitary device which is pivotable, for example, by way of a pivotable mounting between the heater 36 and a support structure. In other examples, a part (i.e. not the whole) of the heater 36 may be pivotable relative a statically mounted part of the heater 36. For example, a heater element to generate radiant heat, optionally including a guide element (such as a reflector or lens) may be pivotable relative a static part of the heater 36. In other examples, the heater element that generates radiant heat may be statically mounted to the support structure, and a guide element which directs the radiant heat from the heater element may be pivotable with respect to the heater element.

The applicant has found that arrangements of a heater with respect to another carriage, such as a coating module or print module, as exemplified above may allow for independent control of a heater to cause an irradiation region to traverse a build platform. Accordingly, a duty cycle of the heater may be controlled independently of operation of a print module or a coating module. This may enable the heater to be active during both a coating cycle and a print cycle within a layer cycle (as will be described below). Yet further, a traversing speed of the irradiation region (a heater traversing rate) may be set independently of the traversing movement of a print module or coating module.

Yet further, the applicant has found that a heater which causes an irradiation region to traverse a build platform may be less complex and less expensive to implement than a static heater to emit radiant heat over a build platform, and also less expensive than arrangements which utilise both a static heater and a traversing heater mounted on a print carriage.

In previously considered arrangements, a heater for fusing build material may be provided on a print carriage, and therefore a duty cycle of the heater is constrained to that of the print carriage. A traversing velocity of a print carriage may be constrained based on the performance of a printhead, for example a maximum velocity may be 20 inches per second (approximately 0.5 metres per second). Such previously considered arrangements may therefore include an auxiliary heater, statically mounted within the arrangement, for pre-heating the build material, with the heater on the print carriage provided to emit a relatively small amount of additional radiant heat to cause selective fusing (i.e. selective according to where print agent is received on the build material, as described above). Such previously considered arrangements therefore use a combination of uniform heating (e.g. from an overhead static heater), and a traversing heater mounted on the print carriage. Mounting a heater on the print carriage may enable the radiant heat applied by the heater to the build material in the final stages of a layer cycle (i.e. after ejecting a print agent onto the build material) to occur at a consistent time delay after ejecting the print agent. In particular, the print agent may result in cooling of the build material, and therefore fusing directly after printing may mitigate this cooling effect in a predictable or uniform manner.

An example method of defining layer cycle data for a layer cycle of an additive manufacturing operation will now be described. For illustrative purposes only, the method will be defined with reference to the additive manufacturing apparatus 22 described above with respect to FIGS. 2 and 3. A layer cycle relates to the selective solidification of a layer of build material in an additive manufacturing process. It may therefore include applying a layer of build material onto a build platform (a coating cycle), printing by selectively ejecting a print agent onto the build material using a print module (a print cycle) and heating to pre-heat the build material and cause fusing of build material (a heating cycle). A layer cycle may be defined at least partly based on pre-determined parameters (e.g. settings or constraints) relating to the additive manufacturing operation, such as the type of build material; the type of print agent to cause selective fusing; a print quality level; a mechanical property setting and a print speed setting. For example, a layer cycle may be adjusted to achieve different mechanical properties (e.g. strength) or print quality (e.g. surface finish), which may represent a trade-off with other properties such as speed or energy efficiency. For the purposes of the present disclosure, such parameters will be referred to as print operation parameters. Print operation parameters may be separately defined to print job data, which may comprise geometric data related to the object to be generated, in particular data defining where print agent is to be ejected in each layer for selective fusing of the build material.

Figure 5:
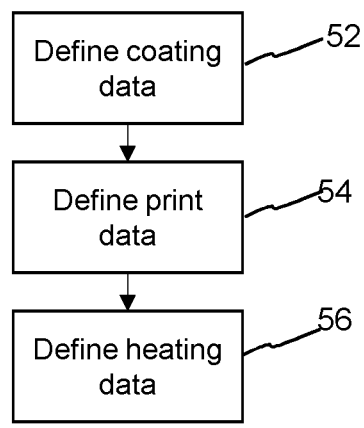
FIG. 5 is a flowchart of a method of defining layer cycle data.

FIG. 5 is a flowchart for a method 50 of defining layer cycle data to control a layer cycle of a print operation. For example, such layer cycle data may be provided to a controller of a print apparatus to conduct the print operation. As will be described below, in examples the layer cycle data includes coating cycle data for controlling a coating cycle; print cycle data for controlling a print cycle, and heating cycle data for controlling a heating cycle of the layer cycle.

In block 52, coating cycle data is defined based on print operation parameters. For example, the coating cycle data may be defined so that a coating cycle comprises a single pass of the coating module over the build platform 12 (e.g. from the forward print supply zone 24 to the aft forward print supply zone 26) at a traversing speed of 10 inches per second (approximately 0.25 metres per second). In this example, the coating cycle data is defined so that the coating cycle within the layer cycle has a duration of approximately 2 s.

In block 54, print cycle data for controlling traversing movement of the print module 14 is defined based on print operation parameters and print job data relating to the object to be generated by additive manufacture. In examples, the print cycle data may be defined to eject print agent over two successive passes based on the print operation parameters (allowing for heating between and during passes) at a variable traversing speed of up to 20 inches per second (approximately 0.5 metres per second). In a particular example, the print cycle data may be defined so that the print cycle commences after the completion of the coating cycle and has a duration of approximately 2 s within the layer cycle.

In block 56, the heating cycle data is defined based on the print operation parameters. In examples, the heating cycle data may be defined so that during a first portion of the layer cycle the irradiation region 20 is caused to traverse the build platform at a first heater traversing rate (for example, between 40 and 80 inches per second (between approximately 1 and 2 metres per second)) optimised for pre-heating build material for a first period of the heating cycle. For example, in this first period the build material on both the build platform and also the build material supply zones 24, 26 may be heated. In examples, the heating cycle data may be defined so that during a second portion of the layer cycle the irradiation region 20 is caused to traverse the build platform 12 at a second heater traversing rate optimised for fusing build material during and/or after the print cycle. For example, during the second portion the heating cycle data may be defined at least partly based on the print cycle data so that the irradiation region 20 follows the traversing movement of the print module 16, and therefore the heater traversing rate may match the traversing rate of the print module 16 (when the heater and print module are moveable along parallel axes). The heater traversing rate may also be adjusted based on an output from the sensor 32, as will be described in detail below with respect to FIG. 7.

In examples, the radiant heat output of the heater elements over the build material supply zones 24, 26 may be controlled separately to the heater elements over the build platform. For example, during heating passes after the print cycle, the heater elements over the build platform may be controlled to output a relatively high radiant heat for fusing, whereas the heating elements over the build material supply zones may be controlled to output a relatively lower radiant heat output for pre-heating.

Figure 6:
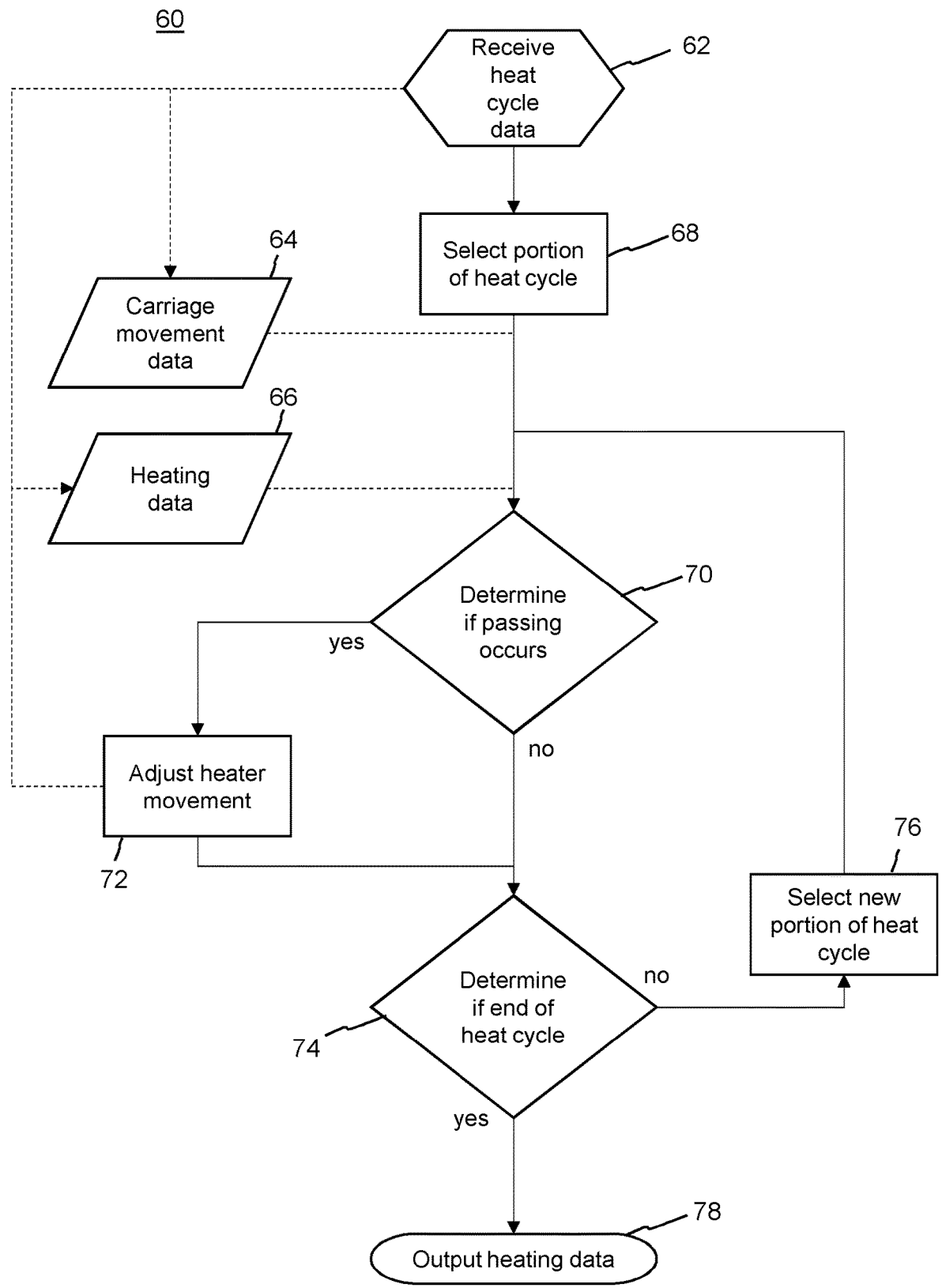
FIG. 6 is a flowchart of a method of defining layer cycle data.

FIG. 6 shows a sub-method 60 of defining heating cycle data to control passing movement of the heater and a separate carriage of the apparatus, which in examples may be either the coating module or the print module, depending on which is moveable along an axis parallel with the axis of traversing movement of the irradiation region 20. For illustrative purposes, the following further description of the sub-method 60 is with reference to the additive manufacturing apparatus 22 described above with respect to FIGS. 2 and 3, such that the separate carriage referred to in this example is the print module 16 which is to traverse over the build platform along a direction parallel to traversing movement of the irradiation region 20. In block 62, layer cycle data is received, including heating cycle data 66 and carriage movement data 64 (which in this example is print cycle data relating to traversing movement of the print carriage 16).

In block 68, a first portion of the heating cycle is selected for analysis, for example a first pass of the heater. In other examples, the first portion may be a period of time within the heating cycle, or a distance of traversing movement of the irradiation region 20. In block 70, it is determined based on the heating cycle data 66 and the carriage movement data 64 whether there is passing movement of the irradiation region and the respective carriage (in this example, the print module 16) in the respective portion of the heating cycle. For example, this may occur when the print module 16 moves into the path of the radiant heat from the heater or vice versa. If passing is determined, in block 72 the heating cycle data 66 is redefined accordingly. For example, the heater traversing rate may be temporarily increased (for example from 60 inches per second to 80 inches per second (approximately 1.5 to 2 metres per second)) to minimise the duration of the passing period.

In block 74 it is determined whether the selected portion of the heating cycle is at the end of the respective heating cycle. If so, the sub-method terminates at block 78 and the heating cycle data is output for use in a layer cycle of a print operation. Otherwise, in block 76 the next portion of the heating cycle is selected for analysis, and the analysis method continues at block 70 as described above.

The above described sub-method can be conducted in advance of a print cycle. The above descried sub-method involves a discretized analysis of the heating cycle. In other examples other analysis methods may be used to determine when passing occurs and adjust heater movement accordingly.

Adjusting the heating cycle data for passing periods as described above may enable the shadowing of radiant heat during a layer cycle, caused by a carriage (such as the print module 16 or the coating module 14) passing through the path of radiant heat, to be minimized. Adjusting the heating cycle data as described above may be particularly appropriate when the heater traversing rate differs substantially from the traversing rate of the respective carriage (e.g. the print module), as in such examples it is likely that such passing will occur during a layer cycle.

In other examples, the heating cycle data may be defined so that the traversing movement of the irradiation region is at least partly out of phase with the traversing movement of the respective separate carriage (i.e. the print module 16 in this example). For example, when the heater traversing rate is equal to or similar to the traversing rate of the print module 16, the heating cycle data and/or the print cycle data may be defined so that the irradiation region 20 traverses the build platform along a direction opposite that of the print module 16. For example, the print cycle data and/or the heating cycle data may be defined so that at a starting configuration the irradiation region 20 is disposed towards one side of the build platform, whereas the print module 16 is disposed towards the opposite side of the build platform. The heater traversing rate may be set to a rate equal or similar to the traversing rate of the print module, but beginning in the opposite direction, such that the traversing movement of the irradiation region 20 and the print module will be out of phase. Unless the traversing rates are equal then the movement of the heater and the print module will not remain out of phase indefinitely. Nevertheless, over the course of a heating cycle, a phase difference may be maintained such that passing of the print module through the irradiation region occurs when the respective directions of traversing movement are opposite one another, and not when the respective directions of traversing movement are the same. Accordingly, the duration of any passing period may be minimized. In other examples where the heater and the coating module traverse along the same axis, the heating data may be defined for out of phase traversing movement relative the coating module in the same manner (i.e. the separate carriage referred to in the examples above may be the coating module).

In examples, heating cycle data can be adjusted during a print operation based on feedback received, for example at the controller 40, during the print operation. In particular, heating cycle data can be adjusted based on feedback received from a sensor 32 for monitoring the temperature of build material.

The applicant has found that excessive heating of build material can cause unintended fusing. As described above, in each layer cycle, print agent is ejected on build material where fusing is intended to occur. The print agent may promote heat transfer from radiant heat to the build material, thereby raising the temperature of the build material where print agent is applied to reach a fusing temperature. However, unintended fusing may occur in certain circumstances. For example, where a relatively large region of a layer is intended to be fused, excessive heat may be generated in the respective region. This heat can be conducted through the layer beyond the boundaries of the respective region, causing unintended fusing outside the boundary. Further, such heat can be conducted from layer to layer.

Figure 7:
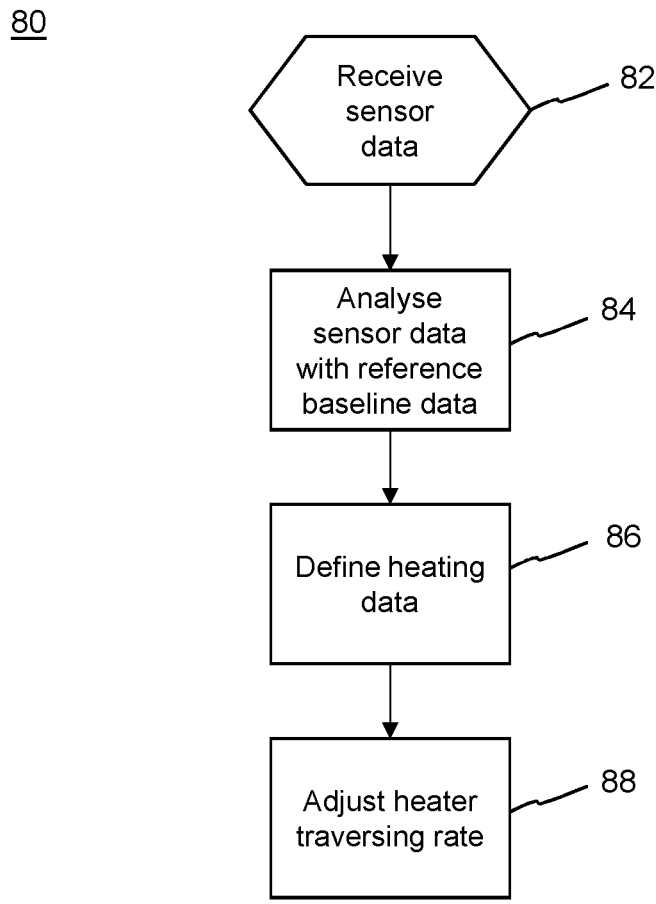
FIG. 7 is a flowchart of a method of adjusting a heater traversing rate.

FIG. 7 shows an example sub-method 80 of adjusting heating cycle data for controlling a heating cycle based on monitoring the temperature of the build material, which will be described for illustrative purposes with respect to the additive manufacturing apparatus 22 of FIGS. 2 and 3. As described above, the apparatus 22 includes a sensor 32 for monitoring the temperature of build material.

The sub-method 80 may be applied at any point during a layer cycle, and may be applied repeatedly within a layer cycle, for example between heating passes based on a temperature profile of build material over the build platform 12. In other examples, the sub-method 80 may be applied for discrete portions of a heating pass, for example by monitoring a portion of the build platform 12 to be heated (such as one quarter of the build platform, one half of the build platform etc), and adjusting the heating cycle data accordingly.

The sub-method 80 is based on comparative analysis between sensor data and baseline data relating to a predicted or target temperature of the build material on the build platform at a respective stage of the heating cycle. In this example, the sub-method 80 is to be applied between heating passes and the baseline data includes a target temperature profile of the build material before each heating pass begins. For example, a heating cycle may include three pre-heating heating passes and two fusing heating passes. The baseline data may define target temperature profiles at each of the three heating passes as follows:

TABLE 1

| Heating Pass Complete | Target Temperature |
| --- | --- |
| 0 | 90° C. (uniform) |
| 1 | 95° C. (uniform) |
| 2 | 100° C. (uniform) |
| 3 | 105° C. (uniform) |
| 4 | Variable profile |
| 5 | Variable profile |

By monitoring a temperature profile of the build data and comparing with a target or baseline temperature profile, the heat output of the heater can be varied to compensate for any overheated or under heated portions of the build material.

As shown in Table 1, in this example the target temperature is uniform for the three pre-heating passes, and is variable during the two fusing passes owing to the application of print agent and the resulting selective fusing of build material.

In block 82, sensor data is received relating to a temperature profile of a portion of the build platform 12 (or build material received thereon). In block 84, the controller 40 analysis the sensor data with reference to baseline data to determine whether any portion of the build platform 12 is hotter or cooler than the baseline profile. The baseline data may be a predicted temperature or target temperature, and may define a varying temperature profile over the build platform (e.g. in two dimensions). In block 86, the controller 40 determines an adjustment to the profile of radiant heat to be output in the subsequent pass to compensate for any overheating or under heating. For example, if a temperature of a particular region of build material is too high, the controller 40 may reduce the radiant heat output of a corresponding heater element of the heater 18 when the irradiation region 20 is over the respective region. Accordingly, the controller 40 and heater 18 may compensate for overheating or under heating by applying variable profile of radiant heat which varies both along the first and second lateral axes.

The controller 40 may adjust the heater traversing rate (block 88). For example, when a portion of build material is under heated, the heater traversing rate may be reduced when the irradiation region is over the respective region.

Depending on the type of heater element, changing the heater traversing rate may be more responsive than changing the heater output owing to any lag caused by a rate at which the heater output can be reduced or increased. Adjusting the heater traversing rate may be particularly effective for edge regions of the build platform which may tend to lose heat easily by conduction, whereas heat may easily build towards a central region of a build platform, particularly for bulky objects in which a large amount of material is to be fused.

Figure 8:
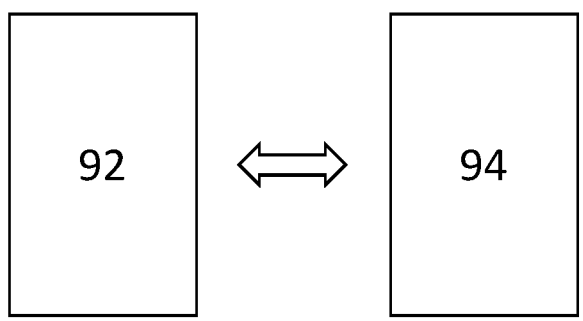
FIG. 8 is a simplified schematic view of a machine-readable medium and a processor.

FIG. 8 shows a non-transitory machine-readable medium 92 encoded with instructions executable by a processor 94. In an example, the instructions include instructions to define coating cycle data to control a coating cycle (block 52 of FIG. 5); define print cycle data to control a print operation (block 54 of FIG. 5) and define heating cycle data to control a heating operation (block 56 of FIG. 5) as described above. The heating cycle data may be defined so that the irradiation region traverses the build platform as the print module traverses the build platform. Further, the coating cycle data, print cycle data and heating cycle data may be defined so that the coating module and print module move relative the heater during the layer cycle.

Examples in the present disclosure can be provided as methods, systems or machine readable instructions, such as any combination of software, hardware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. Additive manufacturing apparatus comprising:
a heater to direct radiant heat onto an irradiation region of a build platform, at least part of the heater being moveable to cause the irradiation region to traverse over the build platform;
first and second supply zone platforms laterally adjacent to and on opposite sides of the build platform, the supply zone platforms to receive build material by conveyance from a separate reservoir;
a coating module moveable relative the heater to traverse the build platform and supply zone platforms to apply the build material from the supply zone platforms onto the build platform; and
a print module moveable relative the heater to traverse the build platform to selectively eject a print agent onto the build material.

2. Additive manufacturing apparatus according to claim 1, wherein the heater is to traverse the build platform.

3. Additive manufacturing apparatus according to claim 1, wherein a heater element or a guide element of the heater is pivotable with respect to the build platform to cause the irradiation region to traverse over the build platform.

4. Additive manufacturing apparatus according to claim 1, wherein a carriage comprising the print module or the coating module is moveable below the heater.

5. Additive manufacturing apparatus according to claim 4, wherein the carriage is provided with a reflector for reflecting radiant heat from the heater.

6. Additive manufacturing apparatus according to claim 1, wherein the heater comprises a statically mounted part and a pivotable part, the pivotable part to direct radiant heat from the statically mounted part onto the supply zone platforms adjacent to the build platform, and wherein the coating module is to apply build material from the supply zone platforms onto the build platform.

7. Additive manufacturing apparatus according to claim 1, wherein the heater is to direct radiant heat so that the irradiation region traverses the build platform along a first lateral axis;
- wherein the print module is to traverse the build platform along a direction parallel with the first lateral axis, and
- wherein the heater has a width along a second lateral axis orthogonal to the first lateral axis which is greater than a width of the print module so that in use the heater extends over the supply zone platforms.

8. Additive manufacturing apparatus according to claim 1, wherein the heater is to direct radiant heat so that the irradiation region traverses the build platform along a first lateral axis during a heating cycle;
- wherein a carriage comprising the print module or the coating module is to traverse the build platform along a direction parallel with the first lateral axis; and
- wherein the additive manufacturing apparatus further comprises a controller configured to control the heater and/or the carriage so that the heating cycle is out of phase with traversing movement of the carriage.

9. Additive manufacturing apparatus according to claim 1, wherein the heater is to direct radiant heat so that the irradiation region traverses the build platform along a first lateral axis;
- wherein a carriage comprising the print module or the coating module is to traverse the build platform along a direction parallel with the first lateral axis; and
- wherein the additive manufacturing apparatus further comprises a controller configured to control a heater traversal rate at which the irradiation region traverses the build platform; and
- wherein the controller is configured to temporarily increase the heater traversal rate for a passing phase of a heating cycle in which the carriage passes below the heater.

10. Additive manufacturing apparatus according to claim 1, wherein the heater is to direct radiant heat so that the irradiation region traverses the build platform along a first lateral axis during a heating cycle;
- wherein the heater is elongate along a second lateral axis orthogonal to the first lateral axis; and
- wherein the heater comprises a plurality of heater elements along the second lateral axis, each having a variable power output, so that the heater is for emitting radiant heat in a profile which varies along the second lateral axis.

11. Additive manufacturing apparatus according to claim 10, further comprising:
- a sensor to determine a temperature profile of build material on the build platform which is variable along the first and second lateral axes;
- a controller configured to control a power output of each heater element during a heating cycle based on an output of the sensor, so that the heater is for emitting radiant heat in a profile which varies along the first and second lateral axes.

12. Additive manufacturing apparatus comprising:
- a build platform having two laterally adjacent supply zone platforms opposite one another along sides of the build platform, the build platform to receive build material from the supply zone platforms, the supply zone platforms to receive build material by conveyance from a separate reservoir;
- a heater to direct radiant heat to traverse the build platform and the supply zone platforms along a first lateral axis;
- a carriage to traverse the build platform along a direction parallel with the first lateral axis;
- wherein the carriage comprises a coating module to apply build material from the supply zone platforms onto the build platform or a print module to eject a print agent onto build material on the build platform; and
- wherein the carriage is moveable to traverse the build platform independently of the heater.

* * * * *